United States Patent
Nitsan et al.

(10) Patent No.: US 10,809,887 B2
(45) Date of Patent: Oct. 20, 2020

(54) EVALUATING USER INTERFACE EFFICIENCY

(71) Applicant: HEWLETT PACKARD ENTERPRISE DEVELOPMENT LP, Houston, TX (US)

(72) Inventors: Amichai Nitsan, Yehud (IL); Yael Peisachov, Yehud (IL); Yuval Koren, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 723 days.

(21) Appl. No.: 15/032,700

(22) PCT Filed: Jan. 30, 2014

(86) PCT No.: PCT/US2014/013835
§ 371 (c)(1),
(2) Date: Apr. 28, 2016

(87) PCT Pub. No.: WO2015/116099
PCT Pub. Date: Aug. 6, 2015

(65) Prior Publication Data
US 2016/0253061 A1 Sep. 1, 2016

(51) Int. Cl.
*G06F 3/0484* (2013.01)
*G06F 11/34* (2006.01)

(52) U.S. Cl.
CPC ........ *G06F 3/0484* (2013.01); *G06F 11/3438* (2013.01); *G06F 2201/87* (2013.01)

(58) Field of Classification Search
None
See application file for complete search history.

(56) References Cited

U.S. PATENT DOCUMENTS

| | | | |
|---|---|---|---|
| 7,350,190 B2 | 3/2008 | Torres et al. | |
| 7,793,260 B2 | 9/2010 | Fields et al. | |
| 8,108,800 B2 | 1/2012 | Kantamneni | |
| 8,924,942 B1* | 12/2014 | Makuch | G06F 9/44 |
| | | | 715/762 |
| 9,910,487 B1* | 3/2018 | Abrams | G06F 3/01 |
| 10,108,316 B2* | 10/2018 | Lyons | G06Q 30/0201 |

(Continued)

FOREIGN PATENT DOCUMENTS

| | | |
|---|---|---|
| JP | 4822166 B2 | 4/2002 |
| KR | 20120105735 A | 9/2012 |
| WO | 2012094021 A1 | 7/2012 |

OTHER PUBLICATIONS

Nielsen, Jakob, "Iterative User-Interface Design" IEEE, Nov. 1993.*

(Continued)

*Primary Examiner* — James T Tsai

(57) ABSTRACT

A method for evaluating user interface efficiency includes discerning user actions with the user interface occurring between each of a plurality of adjacent pairs of transaction points. Those adjacent pairs of transaction points are evaluated to identify a given one of a plurality of user flows associated with the user interface. The identified user actions occurring between each adjacent pair of transaction points are assessed to calculate an efficiency score. The efficiency score is associated with the identified user flow and is indicative of user interface efficiency.

18 Claims, 3 Drawing Sheets

(56) References Cited

U.S. PATENT DOCUMENTS

| | | | |
|---|---|---|---|
| 2006/0199167 A1 | 9/2006 | Yang et al. | |
| 2006/0271856 A1* | 11/2006 | Raymond | G06F 8/38 |
| | | | 715/730 |
| 2007/0150556 A1* | 6/2007 | Fukuda | G06F 16/958 |
| | | | 709/219 |
| 2009/0024964 A1 | 1/2009 | Kantamneni | |
| 2009/0222817 A1* | 9/2009 | Faatz | G06Q 10/06 |
| | | | 718/100 |
| 2012/0068845 A1 | 3/2012 | Kruglick | |
| 2012/0159322 A1 | 6/2012 | Ikegami | |
| 2013/0346950 A1* | 12/2013 | Horovitz | G06F 11/3688 |
| | | | 717/128 |

OTHER PUBLICATIONS

Sears, Andrew, "AIDE: A step toward metric-based development tools." ACM UIST '95, Nov. 14-17, 1995.*

K. Oyama, et al., "A Concept Lattice for Recognition of User Problems in Real User Monitoring" IEEE, 2011 18th Asia-Pacific Software Engineering Conference (Year: 2011).*

R. Jacob, et al., "Integrality and Separability of Input Devices," ACM Transactions on Computer-Human Interaction, vol. 1, No. 1, Mar. 1994, pp. 3-26. (Year: 1994).*

Korean Intellectual Property Office, International Search Report and Written Opinion, dated Oct. 27, 2014, 12 pages, Daejeon Metropolitan City, Republic of Korea.

Moso Technology, Using the Web Testing Scorecard to Measure Website Functionality, 2010, 9 pages http://moso-technology.com/technology/web-tecitnology/using-the-web-testing-scorecard-to-measure-website-functionality/.

"Real User Monitor", HP, Apr. 18, 2014, 5 pages. <https://web.archive.org/web/20140418215720/http://www8.hp.com/us/en/software-solutions/software.html?compURI=1172877>.

Correlsense, "Real User Monitoring", retrieved from the Internet on Dec. 7, 2018, 5 pages. <https://www.real-user-monitoring.com/>.

Komogortsev, et al., "An Effort Based Model of Software Usability", Jul. 2009, Proceedings of the International Conference on Software Engineering Theory and Practice, 9 pages.

WilipediA, "DevOps", retrieved from the Internet on Dec. 7, 2018, 8 pages. <www.wikipedia.org/wiki/DevOps>.

* cited by examiner

EVALUATING USER INTERFACE EFFICIENCY

CROSS-REFERENCE TO RELATED APPLICATION

This application is a U.S. National Stage Application of and claims priority to international Patent Application No. PCT/US2013/013835, filed on Jan. 30, 2014, and entitled "EVALUATING USER INTERFACE EFFICIENCY," the entire content of which is hereby, incorporated in its entirety.

BACKGROUND

Users interact with an application via a user interface through which the users can each initiate a series of actions in an attempt to achieve a desired goal. User satisfaction with an application can be effected by the efficiency of its user interface. The easier a user finds it to achieve a desired result, the more pleased the user is with the application. In other words, an efficient user interface can draw more users to a given application as well as make them more productive when using the application.

DRAWINGS

DETAILED DESCRIPTION

Figure 1:
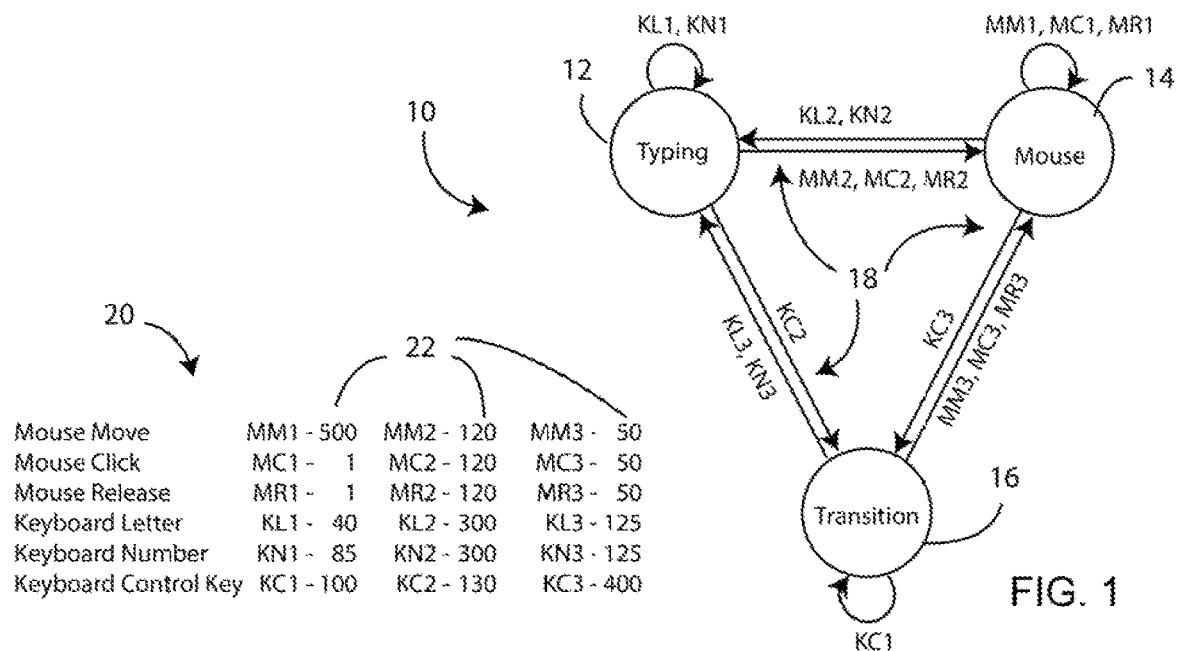
FIG. 1 depicts types of actions a user might take with respect to a user interface and corresponding efficiency weights according to an example.

Introduction:

A more efficient user interface is one that enables a user to complete a task in minimal set of user actions. Efficiency is also affected by the relative ease in performing the action required to achieve a desired result. For example, a task that require five mouse clicks may be considered more efficient than a task that requires text entry and two mouse clicks.

Various embodiments described below can be used to evaluate user interface efficiency. In particular, a score can be generated for each of a set of user flows for that interface. A user flow, described in more detail below, is defined by a sequence of transactions a user may initiate through interaction with the user interface. Take, for example, a media streaming application. One user flow may correspond to a sequence of actions taken to create an account. Other user flows may correspond to a series of actions taken to search for content, steps taken to generate a playlist, and steps taken to play content of differing types.

The scores generated can be unique to particular users or averaged across a set of users. The scores can be maintained for each version of the application. Upon release of anew version, an efficiency score for the new version can be compared to the prior version to determine any effect on efficiency. In certain cases, such as e-commerce where every click counts, such information could make a good reason for rolling back to the previous version. When associated with users or a categories of users, efficiency scores can be used to identify users who may need assistance with the application. For example, upon detection of a poor efficiency score or set of scores for a given user, the application may generate a prompt allowing the user to communicate with a help desk or access relevant training resources.

In operation, embodiments track user actions taken with an application's user interface between transaction points. A transaction point is a detectable event that occurs, at least indirectly as a result of a user action with an application's user interface. A transaction point, may correspond to a user's interaction with a given user interface control such as a save button. A transaction point, for example, can be a logical event in which data is exchanged between a client and a server. Examples of transaction points include entering a new module, opening a details dialog, and selecting a "save" command button. Where the user has access to a keyboard, and mouse, user actions, for example, can include character key strokes, numerical key stores, control keystrokes (page up, page down, tab, and arrow) mouse motion, and mouse clicks. Different values or efficiency weights can be attributed to each type of action to reflect the relative efficiency of each. For example, assigned values may reflect that mouse clicks are more efficient than letter and number keystrokes and that number and letter key strokes are more efficient than control keystrokes. Other types of input devices such as those recognizing gestures, eye motion, and the like are also contemplated. Examining a sequence of transaction points within an application session, the occurrence a given user flow can be detected. Through an evaluation of the user actions occurring between adjacent transaction points that define that user flow an efficiency score is generated and associated with that user flow.

As used herein, a user flow is defined by a series or chain of transaction points. An efficiency score is a score assigned based on user actions occurring between two or more transaction points in a single session. That session may be an application or a user session. An efficiency indicator is a value or guide, generated from one or more evaluation scores that provides actionable information. An efficiency indicator can be an average of a plurality efficiency scores for the same transaction points taken from multiple users over multiple sessions. For the same transaction points, an efficiency indicator can be a comparison of a single or average efficiency score for a user with a benchmark or an average efficiency score for other users. An efficiency indicator may represent a comparison of average efficiency scores between different application versions.

FIG. 1 helps illustrate various types of actions a user may take with a user interface and the corresponding efficiency weights assigned to each type of action. These efficiency weights can be used to determine an efficiency score. FIG. 1 depicts action triangle 10 whose vertices 12, 14, and 16 represent action states where a user interacts with a user interface via a keyboard and a pointing device such as a mouse. In this example, the states include typing 12, mouse 14, and transition 16. Actions in typing state 12 includes letter and number key strokes. Actions in mouse state 14 include mouse motion, mouse (button) click, and mouse (button) release. Actions in transition state 16 can include keyboard control key strokes. Control keys can include page up, page down, arrow, tab and other keys used to transition between sections of a user interface.

Different types of user actions are, in the example of FIG. 1, assigned different, efficiency weights. Moreover, the assigned efficiency weight depends upon whether a user action of a given type occurs within an action state or in a shift between action states. In this example, actions occurring within typing state 12 include repeated letter and key strokes. Actions in mouse state 14 include repeated mouse motions, and mouse clicks and releases. Actions occurring within transition state 16 include control key strokes.

Actions occurring in shifts between action states are depicted by arrows 18. An action occurring in a shift from typing state 12 to mouse state 14 can be mouse motion, a mouse click, or a mouse release. An action occurring in a shift from typing state 12 to transition state 16 can be a control key stroke. An action occurring in a shift from transition state 16 to typing state 12 can be a number or a letter key stroke. An action occurring in a shift from transition state 16 to mouse state 14 can be mouse motion, a mouse click, or a mouse release. An action occurring in a shift from mouse state 14 to typing state 12 can be a number or letter key stroke. Finally, an action occurring in a shift from mouse state 14 to transition state 16 can be a control key stroke.

An efficiency score can be calculated for a sequence of actions by summing the efficiency weights assigned to the corresponding action types for each action in that sequence. To help illustrate, FIG. 1 includes table 20 assigning example efficiency weights 22 to action types distinguishing between action types occurring within an action state 12, 14, and 16 and action types occurring in a shift 18 between action states 12, 14, and 16. Here different action types occurring within actions states 12, 14, and 16 are assigned different efficiency weights. Moreover, the action types occurring in shifts 18 between action states are assigned efficiency weights that differ from weights assigned to the same action type occurring within an action state.

The following represents an example sequence or user actions listed by type:

KC1>MC3>MR1>MM1>MC1>MR1>KL2>KL1> KN1>KC2>KC1

An efficiency score can be calculated by summing the corresponding efficiency scores. Here this would be:

$$100+50+1+500+1+1+300+40+85+130+100=1308$$

This efficiency score can be averaged with others to identify an efficiency indicator for the corresponding application version. The efficiency indicator can be compared to a benchmark or to efficiency indicators of prior versions of the application. The efficiency score can also be associated with a user and compared to a current average to determine the user's proficiency with the application.

Components:

FIG. 1 depicts an example environment 24 in which embodiments may be implemented as efficiency evaluation system 26. Environment 24 is shown to include client devices 28, 30 and 32 and server device 34. Each client device 28-32 represents a computing device configured to communicate requests to and receive responses from server device 34. Server device 34 represents a computing device capable of receiving and responding to requests from client devices 28-32. Components 28-34 are interconnected via link 36. Link 36 represents generally any infrastructure or combination of infrastructures configured to enable electronic communication between components 28-34. For example, link 36 may represent the internet, one or more intranets, and any intermediate routers, switches, and other interfaces.

Server device 34, for example, may serve an application for consumption by client devices 28-32. Users of client devices 28-32 interact with that application via a user interface. Through that user interface, those users can take a number of actions. For example, the users can interact with a number of graphical controls including text boxes, radio buttons, command buttons, links, and the like. Interacting with the user interface of the served application, users can accomplish different tasks with different user flows. Again, a user flow is defined by a series or chain of transaction points which, in this example, are logical events in which data is exchanged between a client device 28-32 and server device 34.

Efficiency evaluation system 26, discussed in more detail below, represents a combination of hardware and programming configured to appraise the evaluation of a user interface for an application served by server device 34. In doing so, system 26, identifies the occurrence of transaction points and the actions with the user interface occurring between the transaction points. Evaluating a series of transaction points, system 26 can detect the occurrence of a particular user flow and calculate an efficiency score for that flow based on the user actions occurring between the transaction points that define the user flow.

System 26 may be integrated within one or all of client devices 28-32. System 26 may be integrated in server device 34 or another server device not shown. System 26 may be distributed across server device 34 and client devices 28-32. For example, system 26 may include an agent component operating on client devices 28-32 for other devices not shown) and an evaluation component operating on server device 34 (or another device not shown). In this distributed model, the agent component is responsible for communicating data identifying transaction points and the actions occurring there between to the evaluation component. The evaluation component can then identify the occurrence of a given user flow and assign a corresponding efficiency score.

Figure 3:
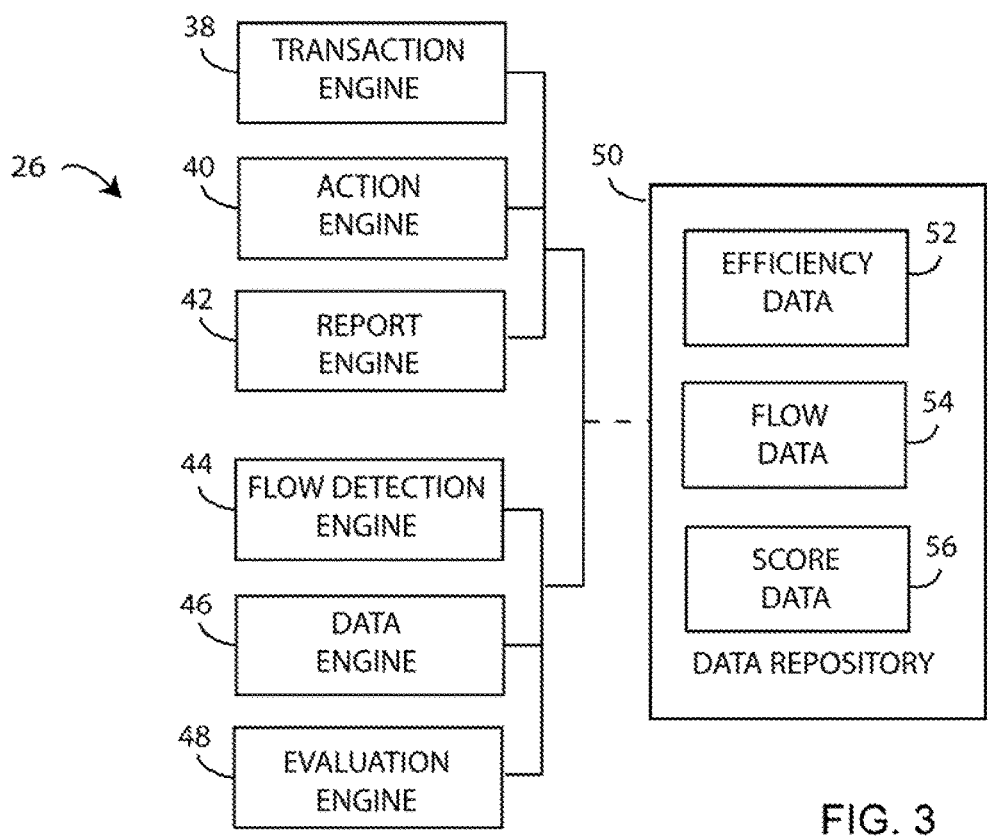
FIG. 3 is a block diagram depicting an example of a system for identifying a common user flow.
Figure 4:
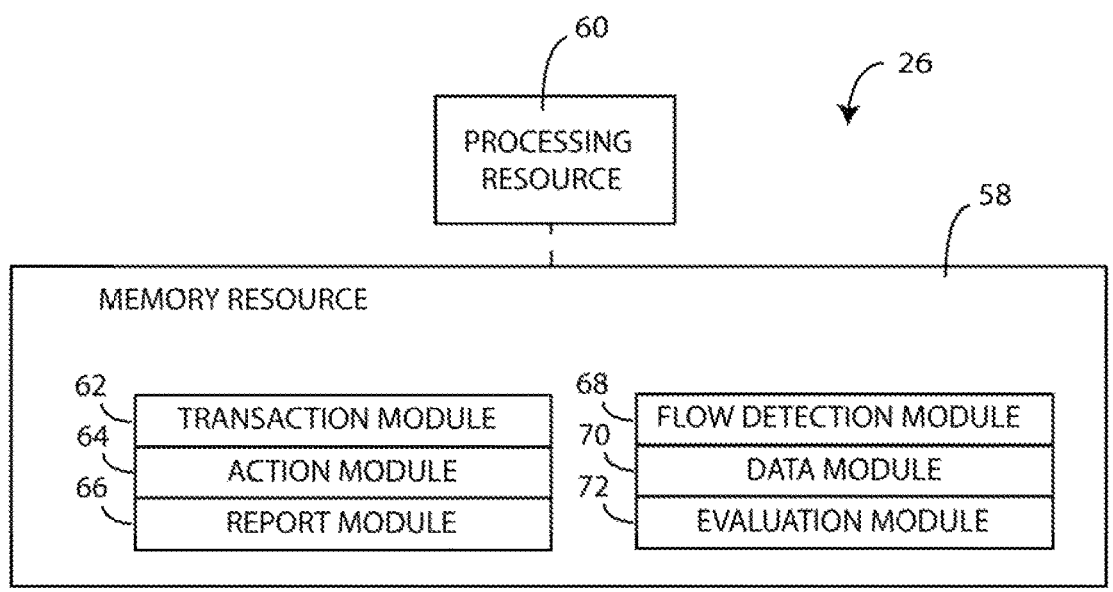
FIG. 4 is a block diagram depicting a memory resource and a processing resource according to an example.

FIGS. 3-4 depict examples of physical and logical components for implementing various embodiments. In FIG. 3 various components are identified as engines 38-48. In describing engines 38-48, focus is on each engine's designated function. However, the term engine, as used herein, refers to a combination of hardware and programming configured to perform a designated function. As is illustrated later with respect to FIG. 4, the hardware of each engine, for example, may include one or both of a processor and a memory device, while the programing is code stored on that memory device and executable by the processor to perform the designated function.

FIG. 3 is a block diagram depicting components of efficiency evaluation system 26. In this example, system 26 includes transaction engine 38, action engine 40, report engine 42, flow detection engine 44, data engine 46, and evaluation engine 48. In performing their respective functions, engines 38-48 may access data repository 50. Repository 50 represents generally any memory accessible to system 26 that can be used to store and retrieve data.

Figure 2:
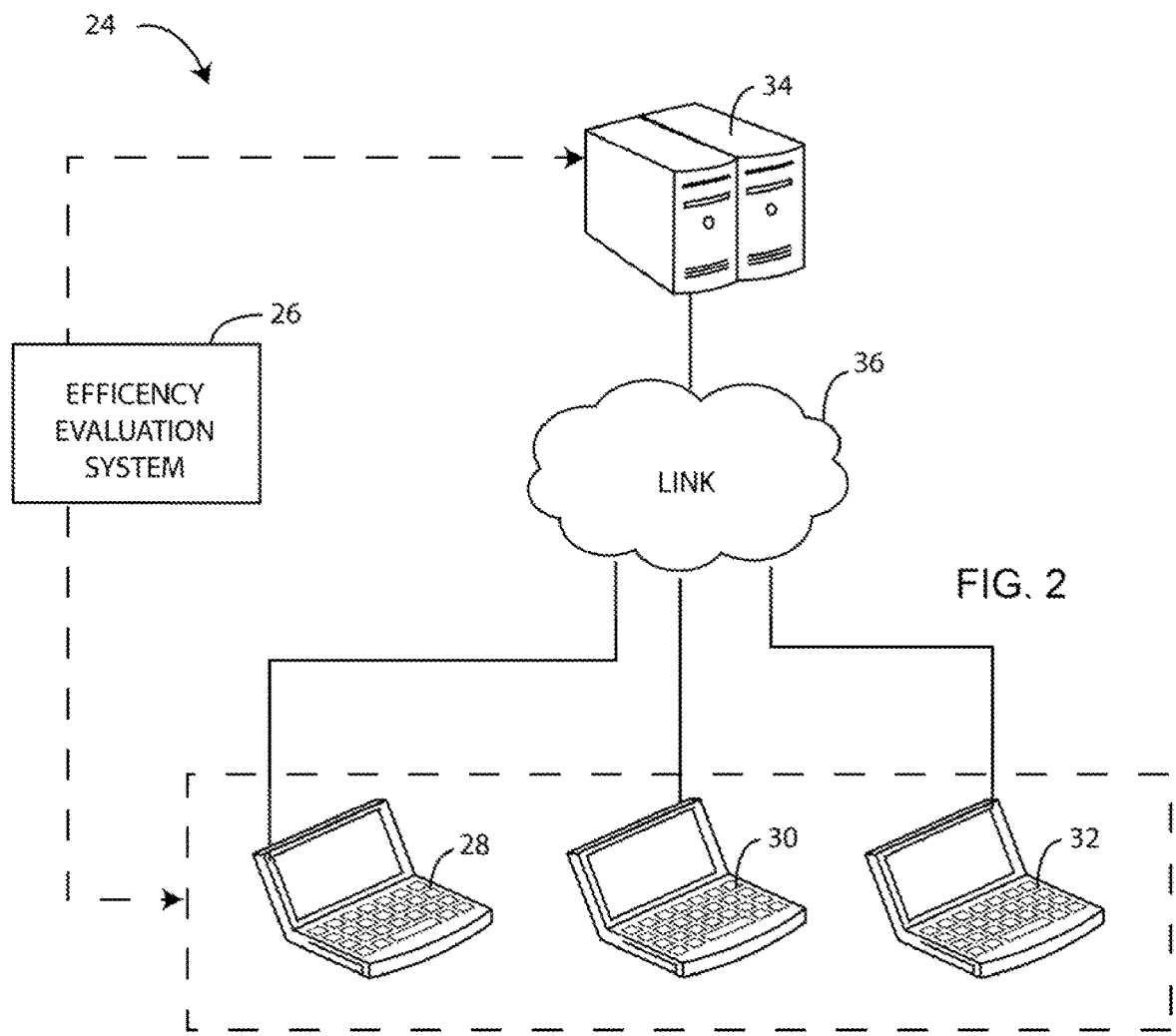
FIG. 2 is a block diagram depicting an example environment in which various embodiments may be implemented.

As noted above with respect to FIG. 2, elements of system 26 may be segmented between an agent component and an evaluation component. For example, engines 38-42 may implement the agent component, while engines 44-48 may implement the evaluation component. It is noted that the agent and evaluation components may be integrated in the same computing device or distributed across computing devices such as client devices 28-32 and server device 34 of FIG. 2. Repository 50 may also be distributed across computing devices of FIG. 2 or implemented using a computing device not shown.

Transaction engine 38 is configure to discern transaction points. Transaction engine 38 may monitor network communications between the client and server devices to identify the occurrence of request response pairs between that client device and a corresponding server device or devices. As will be described below, identified transaction points may be used by report engine 42 to generate an efficiency record communicated by the agent component to the analysis component.

Action engine 40 is configured to identify user actions with an application's user interface occurring between adjacent pairs of transaction points identified by transaction engine 38. Action engine 40 may be configured to discern between a plurality of different types of user actions. In performing its function, action engine 40 may intercept and log signals from input devices of a client device. These signals can be representative different types of keystrokes from a keyboard and various action of a pointing device such as a mouse. Other input devices such as those recognizing a user's gestures are also contemplated. For example, a camera may be an input device used to track a user's eye or hand movements with different movements representing different actions.

Report engine 42 is configured to generate efficiency records from adjacent pairs of transaction points identified by transaction engine 40 and user actions identified by action engine 40. An efficiency record is a tuple that includes first data and second data. The first data identifies an adjacent pair of transaction points. The second data identifies the user actions occurring between the transaction points. In identifying the user actions, the second data may identify an action type of each such action. The user actions may be represented as an action stream assembled from a concatenated list of action types for each identified action. Looking back to FIG. 1, the following may be an example action stream:

KC1>MC3>MR1>MM1>MC1>MR1>KL2>KL1>KN1>KC2>KC1

The tuple may also include third data identifying the user, the application, and the application version. Report engine 42 may then communicate each efficiency record so that it can be stored as efficiency data 52 of data repository 50. Those efficiency records may be segmented in data 52 by time, user, and application or session. Thus, records for a given user, application and session can be examined in order and in context. Ultimately, efficiency records are configured to be processed to identify a score indicative of the efficiency of a user interface such that the score is impacted differently by different action types identified in the records.

Flow detection engine 44 is configured to discern a user flow from a plurality of transaction points. In the example of FIG. 3, data repository 50 is shown to include flow data 54. Flow data 54 represents any data identifying one or more user flows of interest. Such data may include data identifying a sequence of transaction points that define each user flow of interest. In operation, flow detection engine 44 may compare transaction points discerned from efficiency data 52 with flow data 54 to identify the occurrence of a user flow of interest. For example, efficiency data may include a series of efficiency records for a given session. Each record, as explained above, can identify a pair of transaction points. Flow detection engine 44 can examine those records to discern a sequence of transaction points for comparison with flow data 54. In other words, flow detection engine 44 may compare a sequence or a set of adjacent pairs of transaction points identified in efficiency data 52 for a given session with flow data 54 to identify a match. The match indicates the occurrence of a user flow of interest.

It is noted that a user flow can be defined by a single pair or a plurality of pairs of transaction points. An adjacent pair of transaction paints includes transaction points that occur at differing points in time within a given session. Adjacent transaction points may or may not be interrupted by other transaction points. For example, a user flow of interest identified in flow data 54 for a particular application's interface may be represented as the following sequence of transaction points: A>B>C>D>E. That sequence may be represented by adjacent pairs: AB, BC, CD, and DE. Adjacent pairs may be interrupted by other transactions points such as in the following sequence: A>B>C>x>y>D>E. In this example, transaction points x and y interrupt C and D. However, transaction points C and D may still be deemed to be adjacent as they occur one after the other in time. In other words, flow detection engine 46 may identify a match of user flow A>B>C>D>E in flow data 54 from transaction sequence A>B>C>x>y>D>E. Note that this transaction sequence can be represented by pairs of adjacent transaction points AB, BC, Cx, xy, yD, DE.

Data engine 46 is configured to identify user actions with an application's user interface occurring between adjacent pairs of transaction points in sequence of transaction points identified by flow detection engine 44. In other words, data engine 46 is responsible for identifying actions occurring between adjacent pairs of transaction points in a detected user flow. Those actions can be of varying types. In the example of FIG. 3, data engine 46 may perform its function by accessing efficiency records in efficiency data 52. It is noted that while data engine 46 and action engine 40 are depicted as distinct components, they may be the same component. As described, action engine 40 is responsible for identifying the actions that are to be included in an action stream of a given efficiency record. Data engine 46 is then responsible for pulling those actions from those records determined to make up the detected user flow so that they can be assessed, as described below, to generate an efficiency score.

Evaluation engine 48 is configured to evaluate the user actions identified to have occurred between the adjacent pairs or transaction points of a detected user flow. In examining those action, evaluation engine 48 determines an efficiency score associated with the user flow. That efficiency score is impacted differently by the different types of identified actions. Referring back to the example of FIG. 1, different types of actions can be assigned different efficiency weights. Moreover, actions of the same type can be assigned different efficiency weights depending upon whether the given action occurred within an action state or in a transition between action states. Thus evaluation engine 48 can determine an efficiency score by summing the efficiency weights for each action identified for the detected user flow.

Engines 44-48 may perform their functions for each of any number of application sessions such that evaluation engine 48 determines efficiency scores for the same user flow repeated in each such session. In operation flow detection engine 44 may continually examine efficiency data 52 to detect the occurrence of user flows of interest as identified by flow data 54. Over time as efficiency data 52 is populated with efficiency records, flow detection engine 44 may detect a first user flow from a first sequence of a plurality of transaction points and then a second user flow from a second sequence of that plurality of transaction points. Data engine 46 then identifies first user actions occurring between adjacent pairs of transaction points that make up the first sequence and second user actions occurring between adjacent pairs of transaction points of the second sequence. Evaluation engine 48 can then evaluate the first and second user actions to determine corresponding first and second efficiency scores. The first efficiency score is associated with the first user flow and the second score with the second user flow.

Evaluation engine 48 may store efficiency scores in score data 56. In doing so, evaluation engine 48 may associate each determined efficiency score with a corresponding user, application, and application version. Here evaluation engine 48 may also be responsible for determining efficiency indicators. As explained above, an efficiency indicator is a value or guide, generated from one or more evaluation scores. The efficiency indicator may be an average of a plurality efficiency scores for the same user flow taken from multiple users over multiple sessions. The efficiency indicator can be a comparison of a single or average efficiency score for a user with a benchmark or an average efficiency score for other users. An efficiency indicator may represent a comparison of average efficiency scores between different application versions.

Evaluation engine 48 may also be responsible for reporting efficiency indicators. Reporting can include communicating data so that it may be presented to a user. Such may be accomplished by communicating an electronic message such as an e-mail containing the data. Reporting can include communicating web content with the intent that it be displayed. Reporting can also include positing the data to a database for later retrieval. Evaluation engine 48 upon examining score data 56 may determine that an average efficiency score for a given user flow has changed between application versions. In doing so, evaluation engine may report that change as an efficiency indicator that reflects an improvement or a regression in efficiency.

Evaluation engine 48, upon examining score data 56, may determine that an efficiency score for a given user has fallen below an average score for other users with respect to a given user flow. In doing so, evaluation engine 48 may report a corresponding efficiency indicator for the purpose of offering help to that user. Evaluation engine 48, upon examining score data 56, may determine that an average efficiency score for a user flow differs from a benchmark score. That benchmark may be a score associated with a particular task accomplished by that user flow. In doing so, evaluation engine 48 may report a corresponding efficiency indicator that reflects the difference for the purpose comparing the efficiency of the application's user interface with user interfaces of competing applications.

In the foregoing discussion, engines 38-48 were described as combinations of hardware and programming. Engines 38-48 may be implemented in a number of fashions. Looking at FIG. 4, the program it may be processor executable instructions stored on tangible memory resource 58 and the hardware may include processing resource 60 for executing those instructions. Thus memory resource 58 can be said to store program instructions that when executed by processing resource 60 implements system 26 of FIG. 3.

Memory resource 58 represents generally any number of memory components capable of storing instructions that can be executed by processing resource 60. Memory resource 58 is non-transitory in the sense that it does not encompass a transitory signal but instead is made up of more or more memory components configured to store the relevant instructions. Memory resource 58 may be implemented in a single device or distributed across devices. Likewise, processing resource 60 represents any number of processors capable of executing instructions stored by memory resource 58. Processing resource 60 may be integrated in a single device or distributed across devices. Further, memory resource 58 may be fully or partially integrated in the same device as processing resource 60, or it may be separate but accessible to that device and processing resource 60.

In one example, the program instructions can be part of an installation package that when installed can be executed by processing resource 54 to implement system 26. In this case, memory resource 58 may be a portable medium such as a CD, DVD, or flash drive or a memory maintained by a server from which the installation package can be downloaded and installed. In another example, the program instructions may be part of an application or applications already installed. Here, memory resource 58 can include integrated memory such as a hard drive, solid state drive, or the like.

Figure 5:
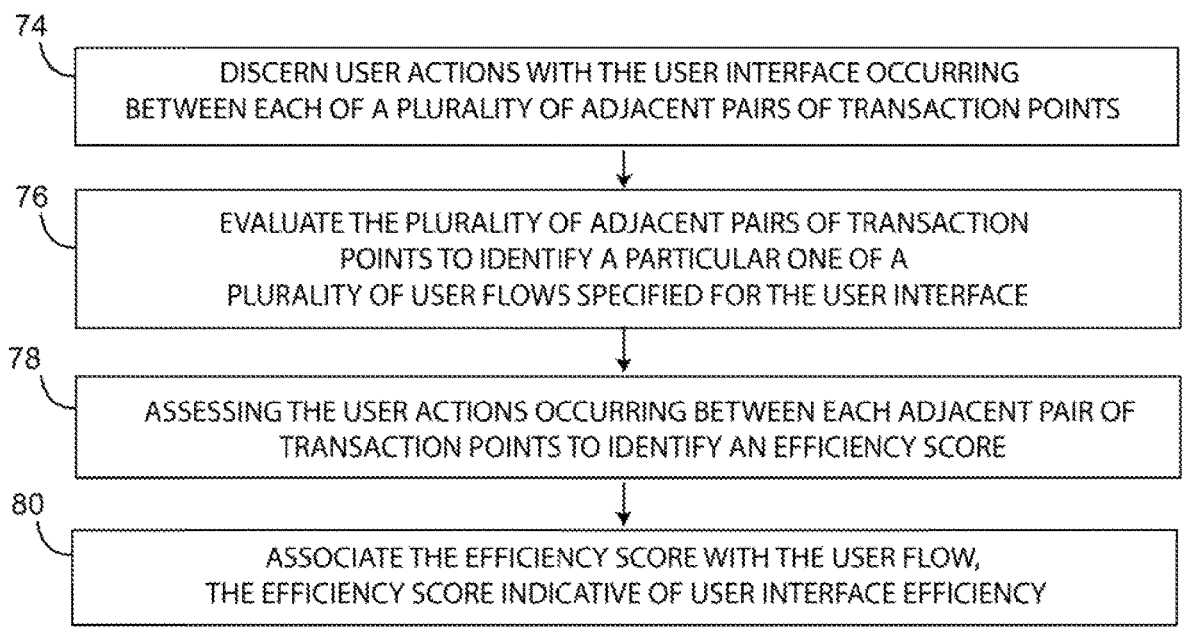
FIG. 5 is a flow diagram depicting actions taken to implement an example.

In FIG. 4, the executable program instructions stored in memory resource 58 are depicted as transaction, action, report, flow detection, data, and evaluation modules 62-72 respectively. Transaction module 62, action module 64 and report module 66 represent program instructions that, when executed, cause processing resource 60 to implement transaction engine 38, action engine 40, and report engine 42 respectively. Flow detection module 68, data module 70, and evaluation module 72 58 represent program instructions that when executed cause the implementation of flow detection engine 44, data engine 46, and evaluation engine 48 respectively Operation:

FIG. 5 is a flow diagram of actions taken to implement a method for evaluating user interface efficiency. In discussing FIG. 5, reference may be made to components depicted in FIGS. 1-4. Such reference is made to provide contextual examples and not to limit the manner in which the method depicted by FIG. 5 may be implemented.

User actions with an application's user interface are discerned (block 74). The discerned actions occur between each of a plurality of adjacent pairs of transaction points. The plurality of adjacent pairs of transaction points are evaluated to identify a given one of a plurality of user flows associated with the user interface (block 76). The user actions occurring between each adjacent pair of transaction points of the identified user flow are assessed to calculate an efficiency score indicative of user interface efficiency (block 78). The efficiency score is associated with the identified user flow (block 80).

Discerning user actions in block 74 can include discerning user actions of varying types. Referring to FIG. 1, different types of user actions 22 can occur in various input states such as typing, mouse, and transition states 12, 14, and 16. Other action types can occur in shifts between action states. Assessing in block 78 then includes calculating an efficiency score such that user actions of different types impact the score differently. In other words different action types occurring within a given state and in different states can impact the score differently. Moreover, actions occurring in a shift between states may impact the score differently than had the same action occurred within an action state.

Referring to FIG. 3, block 74 may be performed as action engine 40 identifies the user actions and report engine 42 generates an efficiency records containing data identifying those actions occurring between the adjacent pairs of transaction points detected by transaction engine 38. Block 74 may be performed as data engine 46 examines efficiency data 52 identifying user actions inefficiency records corresponding to a user flow detected by flow detection engine 44.

Block 76 may be performed by flow detection engine 44 as it examines efficiency data 52 to identify matches with flow data 54. As described above, flow data 52 contains information identifying one or more user flows of interest.

That information may identify, at least indirectly, a sequence of transaction points representative of each such user flow. Flow detection engine 44 may then examine efficiency records in efficiency data 52 for a given session to identify a sequence of transaction points matching a user flow of interest.

Blocks 78 and 80 may be performed by evaluation engine 48 as it examines the user actions identified by data engine 46. As described each identified user action may be associated with an efficiency weight. Evaluation engine 48 may then sum the efficiency weights for the identified actions to generate the efficiency score and store that score in score data 56 such that it is associated with the user flow identified by flow detection engine 44.

While not depicted in FIG. 5, the method may also include using an efficiency score identified in block 78 to determine an efficiency indicator. For example, user action discerned in block 74 may be for a given session. The efficiency score identified in block 78 may then be processed with other efficiency scores associated with the same user flow to determine an efficiency indicator. Those other scores having been calculated based on user actions with the user interface discerned during other sessions. Here the efficiency indicator may be an average efficiency score. Other efficiency indicators are also contemplated. Examples include a comparison of an efficiency score for a user with an average or benchmark score, a comparison of an average score between application versions, as well as a comparison of an average score for a given application with a benchmark.

Conclusion:

FIGS. 1-4 aid in depicting the architecture, functionality, and operation of various embodiments. In particular, FIGS. 1-4 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 5 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for evaluating user interface efficiency, comprising:

discerning, by a processor, user action types with the user interface occurring at and between each of a plurality of adjacent pairs of transaction points, wherein the user action types correspond to action states generated by a user through a plurality of input devices during the transaction points and in shifts between two of the transaction points and are discerned for a given session;

evaluating, by the processor, the plurality of adjacent pairs of transaction points to identify a user flow of a plurality of user flows associated with the user interface;

assessing, by the processor, the user action types occurring at and in shifts between each of the plurality of adjacent pairs of transaction points to calculate an efficiency score for the identified user flow, wherein the user action types occurring within an action state corresponding to a transaction point or in a shift between a pair of action states corresponding to adjacent transaction points impact the efficiency score differently with respect to each other;

associating, by the processor, the efficiency score with the identified user flow, the efficiency score being indicative of user interface efficiency; and processing the efficiency score with a plurality of other efficiency scores calculated for the user flow to determine an efficiency indicator for the identified user flow, the plurality of other efficiency scores having been calculated based on the user action types with the user interface discerned during other sessions.

2. The method of claim 1, wherein:

evaluating the plurality of adjacent pairs of transaction points comprises evaluating the plurality of adjacent pairs of transaction points to identify a first user flow represented by a first sequence of the transaction points and a second user flow represented by a second sequence of the transaction points, assessing the user action types comprises evaluating the user action types occurring between each adjacent pair of transaction points of the first sequence to identify a first efficiency score and assessing the user action types occurring between each adjacent pair of transaction points of the second sequence to identify a second efficiency score, and associating comprises associating the first efficiency score with the first user flow and associating the second efficiency score with the second user flow.

3. A non-transitory memory resource storing instructions that when executed by a processor, cause the processor to:

detect an occurrence of a first action state corresponding to a first transaction point and an occurrence of a second action state corresponding to a subsequent second transaction point, wherein the first action state and the second action state correspond to user action types generated by a user through a plurality of input devices;

identify, with a user interface, the user action types corresponding to the first action state and the second action state and in shifts between the first action state and the second action state; and generate an efficiency record including first data indicative of the user action types occurring within the first and second action states and second data indicative of the user action types occurring in shifts between the first and second action states, wherein the efficiency record is to be processed with other efficiency records to identify a user flow and is further to be processed to identify a score indicative of the efficiency of the user interface and wherein each of the identified user action types that occurred within the first action state and the second action state impact the score indicative of the efficiency of the user interface differently than the identified user action types that occurred in a shift between the first action state and the second action state.

4. The non-transitory memory resource of claim 3, wherein, the instructions further cause the processor to:
discern between a plurality of different user action types; and
wherein the score is impacted differently by different action types indicated by the second data.

5. The non-transitory memory resource of claim 3, wherein the instructions further cause the processor to:
discern between a plurality of user action types occurring within each of a plurality of action states and in shifts between the plurality of action states; and
wherein the second data indicates, for each of the identified user action types, whether that user action type occurred within an action state or in a shift between action states of the plurality of action states.

6. The non-transitory memory resource of claim 3, wherein the instructions further cause the processor to:
detect occurrences of a plurality of sequential transaction points representing the user flow, the plurality of sequential transaction points including the first and second transaction points;
identify, with the user interface, user action types occurring in shifts between the first transaction point and the subsequent second transaction point;
generate a sequence of efficiency records, one for each adjacent pair of the plurality of sequential transaction points, each efficiency record including first data indicative of its corresponding pair of the plurality of sequential transaction points and second data indicative of the identified user action types occurring in shifts between those adjacent pairs of the plurality of sequential transaction points; and
wherein the sequence of efficiency records is to be processed to identify the user flow and an efficiency score for the user flow.

7. The non-transitory memory resource of claim 6, wherein each of the sequence of efficiency records includes third data identifying a user and wherein the sequence of efficiency records is to be processed to identify an efficiency score for the identified user to be compared to efficiency scores for other users.

8. A system for evaluating a user interface efficiency for an application, the system comprising:
a processor; and
a memory resource on which is stored instructions that cause the processor to:

discern a user flow from a plurality of transaction points for an application, the user flow being represented by a plurality of adjacent pairs of the plurality of transaction points;
identify, with a user interface, user actions of varying types occurring in shifts between each adjacent pair of the plurality of transaction points representing a specified user flow, wherein the user actions of varying types correspond to action states generated by a user through a plurality of input devices during and in shifts between each of the adjacent pairs of transaction points; and
evaluate the identified user actions of varying types to determine an efficiency score associated with the user flow, wherein each of the identified user actions of varying types that occurred in a shift between action states corresponding to adjacent pairs of transaction points impact the efficiency score differently than an action state during a transaction point.

9. The system of claim 8, wherein:
the instructions further cause the processor to:
discern a first user flow from a first sequence of the plurality of transaction points and a second user flow from a second sequence of the plurality of transaction points;
identify, with the user interface, a first user action of varying types occurring in shifts between adjacent pairs of transaction points in the first sequence and a second user action of varying types occurring in shifts between adjacent pairs of transaction points in the second sequence; and
evaluate the first user action of varying types to determine a first efficiency score associated with the first user flow and to evaluate the second user action of varying types to determine a second efficiency score associated with the second user flow, the first and second efficiency scores being measures of efficiency for the user interface.

10. The system of claim 8, wherein:
the user interface is for a second version of the application having been updated from a first version, and the efficiency score is a current efficiency score associated with the user flow and the second version; and
wherein the instructions further cause the processor to report a change inefficiency based at least in part on a comparison of the current efficiency score with a previously determined efficiency score associated with the user flow and the first version.

11. The system of claim 8, wherein the instructions further cause the processor to report an efficiency indicator for the user interface based on a comparison of the determined efficiency score and a benchmark efficiency score.

12. The system of claim 8, wherein:
for each of a plurality of sessions, the instructions further cause the processor to discern a user flow from a plurality of transaction points of that session;
for each of the plurality of sessions, the instructions further cause the processor to identify, with the user interface, the user action of varying types occurring in shifts between each adjacent pair of transaction points representing the specified user flow in that session; and
wherein the instructions further cause the processor to determine a plurality of efficiency scores for the user flow and to report an efficiency indicator reflective of the plurality of efficiency scores, wherein each of the plurality of efficiency scores is determined by evaluating the identified user action of varying types for a different session.

13. The method of claim 1, wherein the user flow includes a series or a chain of transaction points.

14. The method of claim 1, wherein the user flow includes a single pair or a plurality of pairs of transaction points.

15. The method of claim 1, wherein the input comprises one or more of typing, pointing, and transition.

16. The method of claim 15, wherein the typing includes letter and number keystrokes, the pointing includes mouse motion, mouse button, click, and mouse button release, and the transition includes control keystrokes.

17. The method of claim 1, wherein the input device comprises one or more of a keyboard, a mouse, function keys that cause a transition between sections of a user interface, and a camera.

18. The method of claim 17, wherein the camera is used to track a user's eye or hand movements with different movements representing different input states.

* * * * *